Dec. 26, 1972     D. S. BRYAN     3,707,383
PREPARED CITRUS FRUIT HALVES AND
METHOD OF MAKING THE SAME
Filed Jan. 2, 1970

INVENTOR
Don S. Bryan

United States Patent Office 3,707,383
Patented Dec. 26, 1972

3,707,383
PREPARED CITRUS FRUIT HALVES AND METHOD OF MAKING THE SAME
Don S. Bryan, P.O. Box 154, Bartow, Fla. 33830
Filed Jan. 2, 1970, Ser. No. 129
Int. Cl. A23l 1/00; A23p 1/04; A23b 7/16
U.S. Cl. 99—100
11 Claims

ABSTRACT OF THE DISCLOSURE

A prepared, edible citrus half of increased shelf life is provided comprising a citrus half including the rind, said citrus half having a cut face and a sealing coating on said cut face preferably comprising an edible hydrophilic colloid.

---

This invention relates to prepared citrus fruit halves and method of making the same and particularly to a prepared gel-coated citrus half, such as a grapefruit half, which can be shipped long distances without drying out or losing flavor or juices.

Many attempts have been made to precut and ship citrus halves such as grapefruit. These prior art attempts have been generally unsuccessful for a variety of reasons. In general, such prior prepared citrus halves have dried out, lost moisture and have had a less than satisfactory appearance. As a result, there has been no satisfactory commercial prepared citrus halves on the market having a satisfactory shelf life.

The present invention provides for the first time a citrus fruit half and method of making the same which is free from the above described problems. The coating used in my invention is completely edible. It stays soft, holds the moisture in the fruit, does not crack or separate from the fruit rind and may be easily removed if desired.

In a preferred embodiment of my invention, I provide a prepared, shippable, edible citrus half including the rind, said citrus half having a cut face and a coating of edible hydrophilic colloid gel on said cut face. Preferably, the hydrophilic colloid gel is a galactan based material such as low methoxy pectin, admixed with an edible material gum such as locust bean gum. Preferably, the gel is formed in citrus juice to which may be added a sweetener such as sugar, a cyclamate, saccharine or the like and a carrageenan. The citrus half is cut adjacent the junction of the albedo and segments to a depth between about one-eighth and about one-half of an inch, preferably about a quarter inch and at the junction of the core and segments to a depth down to albedo but preferably at diameter sufficient to remove the core and seeds of up to about one-half inch. The core portion which is cut is preferably removed if seeds are present and the cavity or cut filled with the gel mixture when the half is coated. The citrus half with the cut face covered with gel is preferably wrapped in polypropylene shrinkfilm for shipment and shipped and stored at a temperature of about 33° to 40° F.

Figure 1:
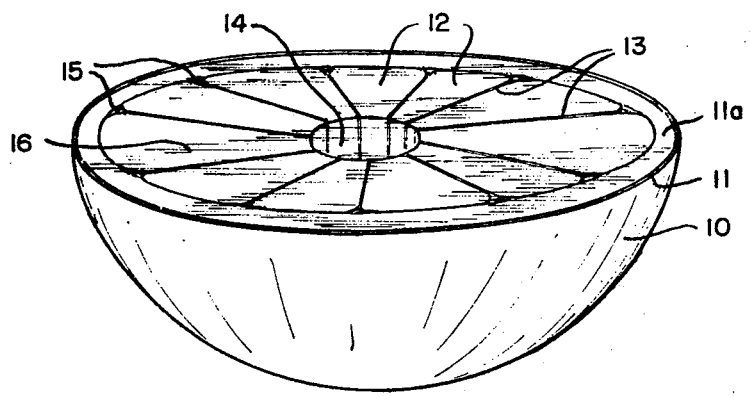
Figure 2:
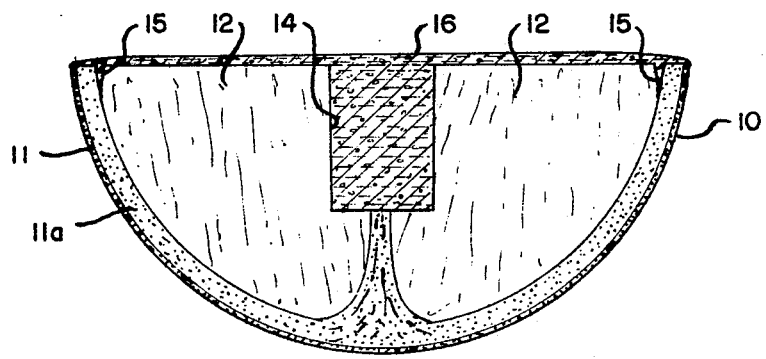

In the foregoing general description of my invention, I have set out certain objects, purposes and advantages of my invention. Other objects, purposes and advantages of this invention will be apparent from a consideration of the following description and the accompanying drawings in which, FIG. 1 is an isometric view of a grapefruit half according to my invention; and FIG. 2 is a section on the line II—II of FIG. 1.

Referring to the drawings, I have illustrated a half grapefruit 10 having a rind 11 and albedo 11a and a plurality of segments 12 separated from one another by membranes 13 extending from albedo 11a to core 14 at the center. The upper portion of the core 14 is cut away from segments 12 and membranes 13 and is preferably removed if seeds are present. A cut line 15 about one-quarter inch deep runs around the inside of the cut face adjacent the albedo. A gel coating 16 covers the cut face including the albedo and fills the cavity left by removal of the upper core portion or the cut surrounding the core.

The grapefruit halves were prepared by washing, waxing and sizing whole grapefruit and then cutting them in half transverse to the core. The upper portion of the core was removed and a ¼ inch cut made around the grapefruit between the albedo and section. The grapefruit halves were drained for 5 minutes, then coated and the center cavity filled with a gel as described hereinafter. The gel was applied maintaining the gel solution between about 165–180° F.

The gel formulations set out in the following examples are typical of those which may be used in practicing my invention.

EXAMPLE I

A gel mix was prepared as follows:

| | Percent |
|---|---|
| Low methoxyl pectin | 80 |
| Locust bean gum | 20 |

These materials were admixed and dispersed in grapefruit juice according to the following formulation:

| | Percent |
|---|---|
| Gel mix above | 1.5 |
| Grapefruit juice | 98.18 |
| Calcium cyclamate | 0.15 |
| Oil essence emulsion | 0.17 |

The gel was dispersed in the grapefruit juice at room temperature in a jacketed vessel and then heated to 180° F. The calcium cyclamate was heated with a small amount of grapefruit juice just below the boiling point and added slowly to the hot dispersed mix in the kettle. The temperature of the kettle was dropped to 170° F. and the grapefruit oil essence emulsion was added. The mix was then transferred to a jacketed Simplex Model A filler and the temperature maintained by circulating hot water through the jacket at 170° F. The hot gel mix was spread over the entire cut surface of the grapefruit and the core cavity filled. The grapefruit were shipped by truck almost two thousand miles over a period of nine days and thereafter used. The product still retained its color, taste and juice and was as attractive as fresh cut fruit at the end of this period.

EXAMPLE II

The gel mix of Example I was dispersed in grapefruit juice according to the following formulation:

| | Percent |
|---|---|
| Gel mix of Example I | 1.3 |
| Grapefruit juice | 78.51 |
| Calcium chloride (anhyd) | 0.02 |
| Sugar | 10 |
| Honey | 10 |
| Oil essence emulsion | 0.17 |

The gel mix was dispersed in the grapefruit juice as in Example I and heated to 180° F. The sugar and honey were added and the temperature stabilized at 170° F., the oil essence emulsion was added and the mix transferred to the jacketed Simplex Model A filler. Grapefruit were then coated and handled as in Example I.

EXAMPLE III

A gel mix was prepared as follows:

| | Percent |
|---|---|
| Low methoxyl pectin | 36.95 |
| Locust bean gum | 18.51 |
| Carrageenans (Gelcarin FC) | 22.27 |
| Carrageenans (Gelcarin DG) | 22.27 |

The Gelcarin FC and Gelcarin DG are carrageenans extracted from sea weed and sold under the above trade names by Marine Colloids Inc. The gel mix components were mixed together and added to grapefruit juice according to the formulation set out in Example I. The completed formulation was applied to the cut surfaces of grapefruit halves precisely as in Example I and the fruit handled in the same manner with like results.

EXAMPLE IV

The gel mix of Example III was formulated in grapefruit juice in the formulation of Example II. Grapefruit halves were again coated on the cut surfaces and treated as in Example I by shipping and using. The fruit was as attractive as fresh cut fruit after shipping and storage and retained its color, taste and juice.

In the foregoing examples, reference is made to oil essence emulsion. This was prepared by mixing the following materials:

|  | G. |
|---|---|
| Uncut pectin | 2 |
| Locust bean gum | 1 |
| Sucrose | 10 |
| Water | 75 |
| Grapefruit oil essence | 6 |
| Grapefruit cold pressed oil | 6 |

Butylated hydroxy toluene was used as an antioxidant with 500 p.p.m. added to the grapefruit oil.

The addition of food coloring to the gel will not change the effectiveness of the gel and may add attractiveness to the product.

The fruit may be precooled, e.g. to 33° F. prior to applying the coating in order to accelerate gelation.

Spraying the rind of the fruit with a blend of water essence and oil essence (30–1) not only enhances the citrus odor, but markedly reduces the tendency to fungal decay on the peel. This is particularly advantageous if the peel is cut to produce a flat bottom surface on the fruit.

Normally, grapefruit halves are freshly prepared each day for the restaurant and cafeteria trade and might keep 48 hours if properly chilled. After this period, the fruit develops an old taste and the fruit shrinks and becomes unattractive. On the other hand, grapefruit halves prepared according to the examples were as good as when prepared after two weeks storage at 40° F. There was no indication of shrinkage or leakage or deterioration of taste at the end of two weeks. The fruit which had had the rind or peel sprayed with oil essence showed no fungal decay or growth on the rind. In some cases, particularly where the peel was trimmed to make the fruit set level, there was some fungal growth on the rind where the oil essence spray was not used; however, the fruit itself was still in good shape.

The gel coating can be easily removed by scraping if desired. The coating is edible and can be left on the fruit and consumed.

While I have set out certain preferred embodiments and practices of my invention in the foregoing specification, it will be obvious that this invention may be otherwise embodied within the scope of the following claims.

I claim:

1. A prepared, edible, natural fresh citrus half of increased shelf life comprising a citrus half including the rind, said citrus half having a cut face and an edible coating on said cut face of sufficient thickness to retain the natural juices of said citrus half against evaporation and spillage, said coating comprising an edible hydrophilic colloid gel from the group consisting of low methoxy pectin, locust bean gum and mixtures thereof.

2. A prepared, edible citrus half of increased shelf life as claimed in claim 1 wherein the coating comprises an edible hydrophilic colloid containing galactan.

3. A prepared, citrus half of increased shelf life as claimed in claim 1 wherein the coating is formed in a suspension of citrus juice.

4. A prepared, edible citrus half of increased shelf life as claimed in claim 1 wherein the citrus half is cut at the junction of the albedo and segment to a depth of about one-eighth to about one-half inch from the cut face and at the junction of the segment and the core to a depth of about one-half inch from the cut face to albedo prior to coating.

5. A prepared, citrus half of increased shelf life as claimed in claim 1 wherein the citrus half is cut at the junction of the albedo and segment to a depth of about one-quarter inch and the core removed prior to coating.

6. A prepared, shippable and edible citrus half as claimed in claim 1 wherein the coating is formed of low methoxyl pectin, locust bean gum and carrageenans.

7. A prepared, shippable and edible citrus half as claimed in claim 6 wherein the coating is formed in a suspension of citrus juice.

8. A method of preparing a shippable and edible natural fresh citrus half comprising the steps of
   (a) cutting a citrus fruit in two halves transverse to the core to provide two cut faces,
   (b) cutting the fruit from the cut face to a depth between about one-eighth to one-half inch in depth adjacent the junction of the albedo and segment and to a depth of about one-half inch at the junction of the core and segment to the albedo,
   (c) applying an aqueous gel suspension of a hydrophilic colloid from the group consisting of low methoxy pectin, locust bean gum and mixtures thereof over said cut face including the albedo, of sufficient thickness to retain the natural juices of said citrus half against evaporation and spillage, and
   (d) permitting the gel suspension to set.

9. The method as claimed in claim 8 wherein the half is coated on its cut face with a suspension of low methoxy pectin, locust bean gum, citrus juice and sweeteners in proportions to form a gel on standing.

10. The method as claimed in claim 8 wherein the rind is sprayed with citrus oil essence.

11. The method as claimed in claim 8 wherein the half is coated on its cut face with a suspension of low methoxyl pectin, locust bean gum, carrageenans, citrus juice and sweeteners in proportions to form a gel on standing.

References Cited

UNITED STATES PATENTS

| 1,973,613 | 9/1934 | Cowgill | 99—132 |
|---|---|---|---|
| 3,516,836 | 6/1970 | Shea | 99—168 |
| 2,611,708 | 9/1952 | Owens et al. | 99—168 |
| 2,703,286 | 3/1955 | Eppell | 99—168 |
| 3,368,909 | 2/1968 | Moore et al. | 99—103 |
| 2,701,767 | 2/1955 | Twieg et al. | 99—132 |
| 2,653,105 | 9/1953 | Gordon | 99—100 |

OTHER REFERENCES

West et al., Textbook of Biochemistry, 4th ed., 1966.
M. B. Jacobs, The Chemistry and Technology of Food and Food Products, 1951.
W. A. Bender, Industrial Gums, 1959.
Lord, Everybody's Cookbook, 1924, p. 407.

WILBUR L. BASCOMB, JR., Primary Examiner

C. P. RIBANDO, Assistant Examiner

U.S. Cl. X.R.

99—131, 132, 168